United States Patent
Diaz et al.

(10) Patent No.: US 10,125,686 B2
(45) Date of Patent: Nov. 13, 2018

(54) TURBINE ENGINE ASSEMBLY AND METHOD OF MANUFACTURING

(71) Applicant: General Electric Company, Schenectady, NY (US)

(72) Inventors: Carlos E. Diaz, Garching bei Munich (DE); John Joseph Rahaim, Cincinnati, OH (US); Jorge de Luis, Montgomery, OH (US); Noel Istvan Macsotai, Loveland, OH (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 356 days.

(21) Appl. No.: 14/958,406

(22) Filed: Dec. 3, 2015

(65) Prior Publication Data

US 2016/0160684 A1 Jun. 9, 2016

Related U.S. Application Data

(60) Provisional application No. 62/087,862, filed on Dec. 5, 2014.

(51) Int. Cl.
*F02C 7/18* (2006.01)

(52) U.S. Cl.
CPC ............ *F02C 7/185* (2013.01); *Y02T 50/675* (2013.01)

(58) Field of Classification Search
CPC .... F02C 7/18; F02C 7/185; F02C 6/08; F01D 9/065; F01D 25/12; F05D 2260/213; Y02T 50/675
USPC ........................................................ 415/179
See application file for complete search history.

(56) References Cited

U.S. PATENT DOCUMENTS

| | | | |
|---|---|---|---|
| 5,392,614 A | * | 2/1995 | Coffinberry .............. F02C 7/12 60/806 |
| 6,584,778 B1 | | 7/2003 | Griffiths et al. |
| 7,000,404 B2 | | 2/2006 | Palmisano et al. |
| 2007/0101731 A1 | | 5/2007 | Bayt et al. |
| 2008/0310955 A1 | | 12/2008 | Norris et al. |
| 2012/0192578 A1 | | 8/2012 | Finney |
| 2013/0186100 A1 | | 7/2013 | Rhoden et al. |
| 2013/0186102 A1 | | 7/2013 | Lo |
| 2013/0291554 A1 | | 11/2013 | Marini et al. |
| 2014/0144139 A1 | | 5/2014 | Alecu et al. |
| 2014/0286763 A1 | | 9/2014 | Munshi et al. |

* cited by examiner

*Primary Examiner* — Logan Kraft
*Assistant Examiner* — John S Hunter
(74) *Attorney, Agent, or Firm* — GE Global Patent Operation; John Darling

(57) ABSTRACT

A turbine engine assembly is provided. The assembly includes a booster compressor that discharges a flow of first compressed air at a first temperature, and a high-pressure compressor (HPC). The HPC receives a first portion of the flow of first compressed air and discharges the first portion at a second temperature higher than the first temperature such that a flow of second compressed air is formed. The assembly also includes a heat exchanger (HEX) that receives a second portion of the flow of first compressed air from the booster compressor and a first portion of the flow of second compressed air from the HPC such that heat is transferred therebetween. The HEX discharges the first portion of the flow of second compressed air at a third temperature lower than the second temperature and higher than the first temperature such that a flow of cooled bleed air is formed.

9 Claims, 2 Drawing Sheets

TURBINE ENGINE ASSEMBLY AND METHOD OF MANUFACTURING

CROSS REFERENCE TO RELATED APPLICATIONS

This application claims benefit of U.S. Provisional Patent Application Ser. No. 62/087,862 filed Dec. 5, 2014 entitled "TURBINE ENGINE ASSEMBLY AND METHOD OF MANUFACTURING", which is hereby incorporated by reference in its entirety.

BACKGROUND

The present disclosure relates generally to turbine engines and, more specifically, systems and methods of cooling compressor bleed air.

At least some known gas turbine engines include a fan, a core engine, and a power turbine. The core engine includes at least one compressor, a combustor, and a high-pressure turbine coupled together in a serial flow relationship. More specifically, the compressor and high-pressure turbine are coupled through a shaft to form a high-pressure rotor assembly. Air entering the core engine is mixed with fuel and ignited to form a high energy gas stream. The high energy gas stream flows through the high-pressure turbine to rotatably drive the high-pressure turbine such that the shaft rotatably drives the compressor. After being discharged from the high-pressure turbine, the gas stream continues to expand as it flows through a low-pressure turbine positioned aft of the high-pressure turbine. The low-pressure turbine includes a rotor assembly coupled to a drive shaft and a fan. The low-pressure turbine rotatably drives the fan through the drive shaft.

Many modern commercial turbine engines operate at increasingly high temperatures to facilitate increasing engine performance and efficiency. However, operating at the increasingly high temperatures can result in damage to hot gas path components over extended periods of operation. As such, at least some known turbine engines include an active cooling system that facilitates reducing a temperature of hot gas path components. For example, the hot gas path components are typically cooled with a flow of compressor bleed air discharged from the high-pressure compressor. In some applications, the compressor bleed air is cooled with a flow of bypass air channeled from a fan duct. However, bleeding bypass air from the fan duct can result in an increase in drag on the turbine engine assembly during flight.

BRIEF DESCRIPTION

In one aspect, a turbine engine assembly is provided. The assembly includes a booster compressor configured to discharge a flow of first compressed air at a first temperature, and a high-pressure compressor coupled downstream from the booster compressor. The high-pressure compressor is configured to receive a first portion of the flow of first compressed air and further configured to discharge the first portion of the flow of first compressed air at a second temperature higher than the first temperature such that a flow of second compressed air is formed. The assembly also includes a heat exchanger configured to receive a second portion of the flow of first compressed air from the booster compressor and a first portion of the flow of second compressed air from the high-pressure compressor such that heat is transferred therebetween. The heat exchanger is further configured to discharge the first portion of the flow of second compressed air at a third temperature lower than the second temperature and higher than the first temperature such that a flow of cooled bleed air is formed.

In another aspect, a system for use in cooling compressor bleed air in a turbine engine assembly is provided. The turbine engine assembly includes a booster compressor, a high-pressure compressor, and a low-pressure turbine. The system includes a first air duct configured to be coupled in flow communication with the booster compressor such that a flow of first compressed air at a first temperature is channeled therethrough, a second air duct configured to be coupled in flow communication with the high-pressure compressor such that a flow of second compressed air at a second temperature higher than the first temperature is channeled therethrough, and a heat exchanger coupled in flow communication with the first and second air ducts. The heat exchanger is configured to receive the flow of first compressed air and the flow of second compressed air such that heat is transferred therebetween. The heat exchanger is further configured to discharge the flow of second compressed air at a third temperature lower than the second temperature and higher than the first temperature such that a flow of cooled bleed air is formed.

In yet another aspect, a method of manufacturing a turbine engine assembly is provided. The method includes coupling a high-pressure compressor downstream from a booster compressor, coupling a first air duct in flow communication with the booster compressor and a heat exchanger, and coupling a second air duct in flow communication with the high-pressure compressor and the heat exchanger. The booster compressor is configured to discharge a first portion of a flow of first compressed air at a first temperature towards the high-pressure compressor. The high-pressure compressor is configured to discharge the first portion of the flow of first compressed air at a second temperature higher than the first temperature such that a flow of second compressed air is formed. The first air duct configured to channel a second portion of the flow of first compressed air towards the heat exchanger, and the second air duct is configured to channel a first portion of the flow of second compressed air towards the heat exchanger such that heat is transferred between the first portion of the flow of second compressed air and the second portion of the flow of first compressed air. The heat exchanger is configured to discharge the first portion of the flow of second compressed air at a third temperature lower than the second temperature and higher than the first temperature such that a flow of cooled bleed air is formed.

DRAWINGS

These and other features, aspects, and advantages of the present disclosure will become better understood when the following detailed description is read with reference to the accompanying drawings in which like characters represent like parts throughout the drawings, wherein.

Figure 1:
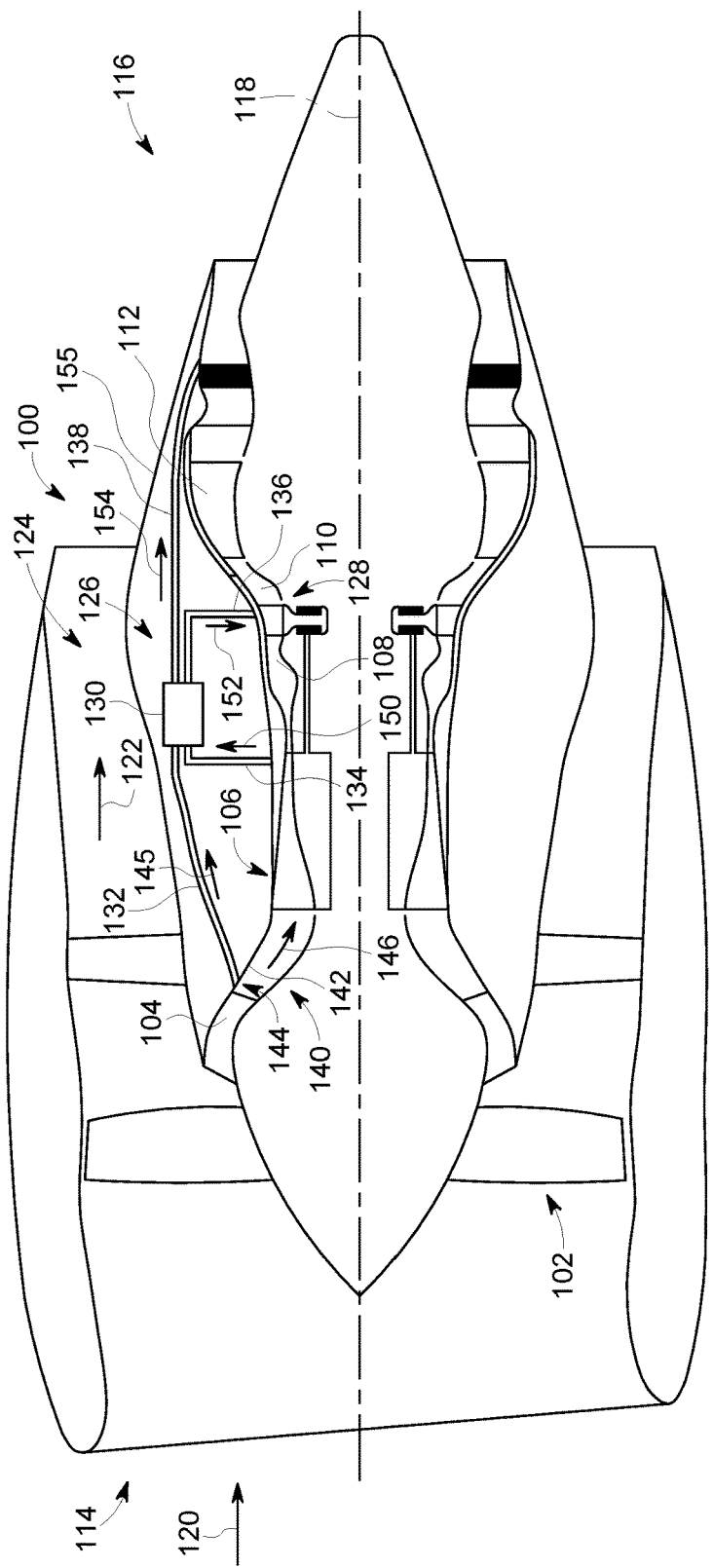
FIG. 1 is a schematic illustration of an exemplary turbine engine assembly.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

Embodiments of the present disclosure relate to turbine engine assemblies including a system for use in cooling compressor bleed air. More specifically, the turbine engine assemblies described herein include a heat exchanger that cools bleed air from a high-pressure compressor with a flow of compressed air from a booster compressor. The flow of compressed air is at a higher temperature than a flow of bypass air channeled through a bypass duct. However, heat transfer between the flow of compressed air and the bleed air is increased by pressurizing the flow of compressed air, which facilitates increasing a mass flow of the flow of compressed air channeled through the heat exchanger. As such, cooling for the compressor bleed air is provided without bleeding air from the bypass duct, and the cooled bleed air is then channeled downstream towards air-cooled components. Moreover, the cooling system described herein can be used in conjunction with turbine engine assemblies that do not include bypass ducts, such as turboshaft engines.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine. It should also be appreciated that the term "fluid" as used herein includes any medium or material that flows, including, but not limited to, air, gas, liquid and steam.

FIG. 1 is a schematic illustration of an exemplary turbine engine assembly 100, such as a turbofan assembly. Turbine engine assembly 100 includes a fan assembly 102, a booster compressor 104, a high-pressure compressor 106, and a combustor 108. Fan assembly 102, booster compressor 104, high-pressure compressor 106, and combustor 108 are coupled in flow communication. Turbine engine assembly 100 also includes a high-pressure turbine 110 coupled in flow communication with combustor 108 and a low-pressure turbine 112. Turbine engine assembly 100 further includes an intake 114, an exhaust 116, and a centerline 118 about which fan assembly 102, booster compressor 104, high-pressure compressor 106, and turbines 110 and 112 rotate.

In operation, a flow of intake air 120 entering turbine engine assembly 100 through intake 114 is channeled through fan assembly 102 towards booster compressor 104, and a flow of bypass air 122 is channeled past fan assembly 102 and through a bypass duct 124. A flow of first compressed air is discharged from booster compressor 104 towards high-pressure compressor 106. A flow of second compressed air is channeled from high-pressure compressor 106 towards combustor 108, mixed with fuel, and the mixture is combusted within combustor 108. High temperature combustion gas generated by combustor 108 is channeled towards turbines 110 and 112. Combustion gas is subsequently discharged from turbine engine assembly 100 via exhaust 116.

In the exemplary embodiment, turbine engine assembly 100 includes a cooling system 126 that facilitates channeling cooled air towards an air-cooled component 128. Exemplary air-cooled components 128 include, but are not limited to, blades, nozzles, and shrouds positioned downstream from combustor 108, and components at an outlet (not shown) of high-pressure compressor 106. Cooling system 126 includes a heat exchanger 130 (e.g., a double pipe heat exchanger or a shell and tube heat exchanger) and a plurality of air ducts coupled in flow communication with heat exchanger 130. More specifically, a first air duct 132 is coupled in flow communication with booster compressor 104 and heat exchanger 130, a second air duct 134 is coupled in flow communication with high-pressure compressor 106 and heat exchanger 130, a third air duct 136 is coupled in flow communication with heat exchanger 130 and air cooled components 128, and a fourth air duct 138 is coupled in flow communication with and extends from heat exchanger 130. Turbine engine assembly 100 also includes a transition duct 140 including at least one side wall 142 extending between booster compressor 104 and high-pressure compressor 106. A variable bleed valve 144 is positioned in side wall 142, and first air duct 132 is coupled in communication with variable bleed valve 144.

In operation, booster compressor 104 discharges a flow of first compressed air at a first temperature. A first portion 146 of the flow of first compressed air is channeled through transition duct 140 and received at high-pressure compressor 106. High-pressure compressor 106 discharges first portion 146 of the flow of first compressed air at a second temperature higher than the first temperature such that a flow of second compressed air is formed. A second portion 145 of the flow of first compressed air is channeled through first air duct 132 and received at heat exchanger 130, and a first portion 150 of the flow of second compressed air is channeled through second air duct 134 and received at heat exchanger 130 such that heat is transferred therebetween. In one embodiment, variable bleed valve 144 is selectively actuated to discharge second portion 145 of the flow of first compressed air towards heat exchanger 130. Heat exchanger 130 then discharges first portion 150 of the flow of second compressed air at a third temperature lower than the second temperature and higher than the first temperature such that a flow of cooled bleed air 152 is formed. The flow of cooled bleed air 152 is channeled through third air duct 136 towards air-cooled components 128.

The flow of first compressed air discharged from booster compressor 104 has a higher temperature and is more highly pressurized when compared to the flow of bypass air 122 channeled through bypass duct 124. For example, at a take-off operating condition, the flow of first compressed air has about 5% less thermal gradient and about 25% greater pressure ratio than the flow of bypass air 122. The greater pressure ratio of air discharged from booster compressor 104 is such that booster compressor 104 discharges the flow of first compressed air towards heat exchanger 130 at a greater mass flow rate than the flow of bypass air 122 channeled through bypass duct 124. As such, the increased mass flow of the flow of first compressed air channeled towards heat exchanger 130 facilitates increasing an amount of heat transferred between second portion 145 of the flow of first compressed air and first portion 150 of the flow of second compressed air within heat exchanger 130.

Moreover, heat exchanger 130 discharges second portion 145 of the flow of first compressed air therefrom such that a flow of propulsive air 154 is formed. More specifically, in one embodiment, the flow of propulsive air 154 is channeled through fourth air duct 138, and fourth air duct 138 extends from heat exchanger 130 such that the flow of propulsive air 154 is discharged downstream of low-pressure turbine 112. Fourth air duct 138 is oriented substantially coaxially with centerline 118. As such, the flow of propulsive air 154 provides additional propulsion for turbine engine assembly 100. Alternatively, fourth air duct 138 is oriented such that the flow of air channeled therethrough is discharged through a core cowl 155, either within bypass duct 124 or aft of bypass duct 124, and mixed with the flow of bypass air 122 channeled through bypass duct 124 to facilitate supplementing thrust.

Figure 2:
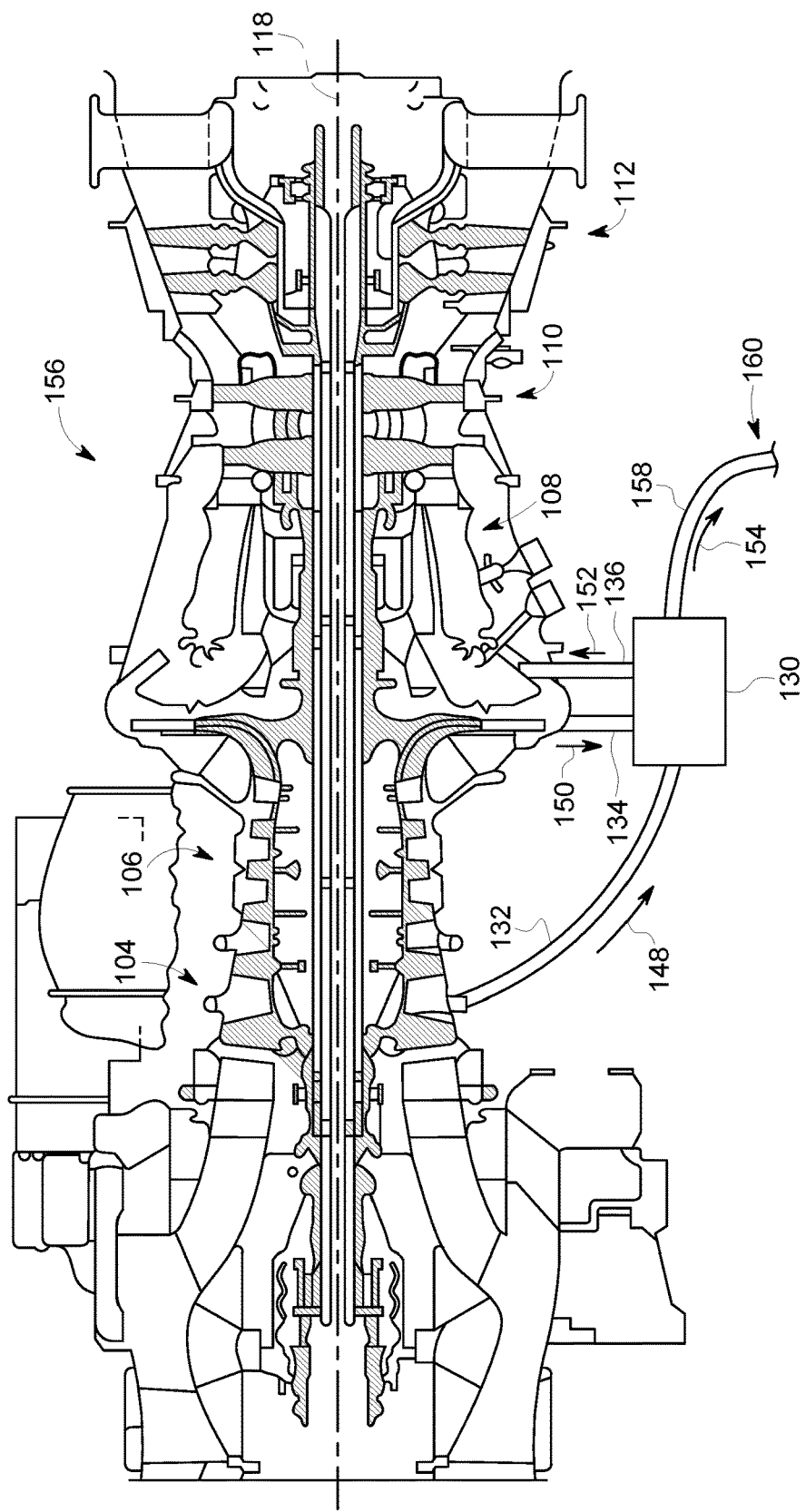
FIG. 2 is a schematic illustration of an alternative turbine engine assembly.

FIG. 2 is a schematic illustration of an alternative turbine engine assembly 156, such as a turboshaft assembly. In the exemplary embodiment, heat exchanger 130 discharges second portion 148 of the flow of first compressed air therefrom such that the flow of propulsive air 154 is formed. The flow of propulsive air 154 is channeled through a fifth air duct 158, and fifth air duct 158 extends from heat exchanger 130 such that the flow of propulsive air 154 is discharged in a substantially radial direction from centerline 118 of turbine engine assembly 156. More specifically, a discharge portion 160 of fifth air duct 158 is oriented such that the flow of propulsive air 154 is discharged in a substantially radial direction from centerline 118 of turbine engine assembly 156. As such, in one embodiment, the flow of propulsive air 154 is directed in a downward direction to provide additional propulsion in the form of lift for turbine engine assembly 156 for use by aerial vehicles having vertical take-off and landing capability.

The turbine engine assemblies and methods described herein relate to turbine engine assemblies that include a cooling system for cooling compressor bleed air. More specifically, the turbine engine assemblies described herein include a heat exchanger that facilitates transferring heat between a flow of compressor bleed air from a high-pressure compressor and a flow of compressed air from a booster compressor. The compressor bleed air is cooled and provided to air-cooled components of the turbine engine assembly. Moreover, in one embodiment, air ducts of the cooling system are oriented such that the flow of compressed air discharged from the heat exchanger is used to provide additional propulsion for the turbine engine assembly. As such, the assemblies and methods described herein facilitate cooling compressor bleed air with a flow of air channeled from a source other than a fan bypass duct.

An exemplary technical effect of the turbine engine assemblies and methods described herein includes at least one of: (a) cooling compressor bleed air to be provided to air-cooled components; (b) reducing drag on the turbine engine assembly; and (c) reducing a size of the heat exchanger for the turbine engine assembly.

Exemplary embodiments of the gas turbine engine are described above in detail. The assembly is not limited to the specific embodiments described herein, but rather, components of systems and/or steps of the methods may be utilized independently and separately from other components and/or steps described herein. For example, the configuration of components described herein may also be used in combination with other processes, and is not limited to practice with only gas turbine engines and related methods as described herein. Rather, the exemplary embodiment can be implemented and utilized in connection with many applications where cooling compressor bleed air is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine assembly, comprising:
a booster compressor configured to discharge a flow of first compressed air at a first temperature;
a high-pressure compressor coupled downstream from said booster compressor, said high-pressure compressor configured to receive a first portion of the flow of first compressed air and configured to discharge the first portion of the flow of first compressed air at a second temperature higher than the first temperature such that a flow of second compressed air is formed; and
a heat exchanger configured to receive a second portion of the flow of first compressed air from said booster compressor and a first portion of the flow of second compressed air from said high-pressure compressor such that heat is transferred therebetween, said heat exchanger further configured to discharge the first portion of the flow of second compressed air at a third temperature lower than the second temperature and higher than the first temperature such that a flow of cooled bleed air is formed, wherein said heat exchanger is further configured to discharge the second portion of the flow of first compressed air therefrom such that a flow of propulsive air is formed;
a low-pressure turbine coupled downstream from said high-pressure compressor;
a first air duct coupled in flow communication with said booster compressor and said heat exchanger, said first air duct configured to channel the second portion of the flow of first compressed air therethrough;
a second air duct coupled in flow communication with said high-pressure compressor and said heat exchanger, said second air duct configured to channel the first portion of the flow of second compressed air therethrough;
a third air duct coupled in flow communication with said heat exchanger and said air-cooled component, said third air duct configured to channel the flow of cooled bleed air towards said air-cooled component;
a fourth air duct coupled in flow communication with said heat exchanger, said fourth air duct extending from said heat exchanger such that the flow of propulsive air is discharged downstream from said low-pressure turbine; and
an air-cooled component coupled in flow communication with said heat exchanger, said air-cooled component configured to receive the flow of cooled bleed air.

2. The turbine engine assembly in accordance with claim 1, wherein said fourth air duct is oriented such that the flow of propulsive air is discharged in a substantially radial direction from a centerline of the turbine engine assembly.

3. The turbine engine assembly in accordance with claim 1, further comprising:
a transition duct comprising at least one side wall extending between said booster compressor and said high-pressure compressor; and
a variable bleed valve defined in said at least one side wall, said variable bleed valve configured to be selectively actuated to discharge the second portion of the flow of first compressed air towards said heat exchanger.

4. The turbine engine assembly in accordance with claim 1, further comprising a bypass duct configured to channel a flow of bypass air therethrough, wherein said booster compressor is configured to discharge the flow of first compressed air at a greater mass flow rate than the flow of bypass air.

5. A system for use in cooling compressor bleed air in a turbine engine assembly comprising a booster compressor, a high-pressure compressor, and a low-pressure turbine, comprising:
a first air duct coupled in flow communication with the booster compressor such that a flow of first compressed air at a first temperature is channeled therethrough;
a second air duct coupled in flow communication with the high-pressure compressor such that a flow of second compressed air at a second temperature higher than the first temperature is channeled therethrough; and
a heat exchanger coupled in flow communication with said first and second air ducts, wherein said heat exchanger is configured to receive the flow of first compressed air and the flow of second compressed air such that heat is transferred therebetween, said heat exchanger further configured to discharge the flow of second compressed air at a third temperature lower than the second temperature and higher than the first temperature such that a flow of cooled bleed air is formed;
a third air duct coupled in flow communication with said heat exchanger, said third air duct configured to channel the flow of cooled bleed air towards an air-cooled component; and
a fourth air duct coupled in flow communication with said heat exchanger, said fourth air duct extending from said heat exchanger such that a portion of the flow of first compressed air is discharged downstream from the low-pressure turbine as a flow of propulsive air.

6. The system in accordance with claim 5, wherein said fourth air duct is oriented such that the flow of propulsive air is discharged in a substantially radial direction from a centerline of the turbine engine assembly.

7. A method of cooling a turbine engine assembly comprising a booster compressor, a high-pressure compressor, and a low-pressure turbine, the method comprising:
discharging a first portion of a flow of first compressed air from the booster compressor at a first temperature towards the high-pressure compressor;
discharging the first portion of the flow of first compressed air from the high-pressure compressor at a second temperature higher than the first temperature such that a flow of second compressed air is formed;
channeling a second portion of the flow of first compressed air from the booster compressor towards a heat exchanger via a first air duct;
channeling a first portion of the flow of second compressed air from the high-pressure compressor towards the heat exchanger via a second air duct such that heat is transferred between the first portion of the flow of second compressed air and the second portion of the flow of first compressed air such that a flow of cooled bleed air is formed at a third temperature lower than the second temperature and higher than the first temperature;
channeling the flow of cooled bleed air from the heat exchanger via a third air duct to an air-cooled component;
and
discharging the second portion of the flow of first compressed air via a fourth air duct such that a flow of propulsive air is formed and discharged downstream from the low-pressure turbine.

8. The method in accordance with claim 7, wherein the fourth air duct is oriented such that the flow of propulsive air channeled therethrough is discharged in a substantially radial direction from a centerline of the turbine engine assembly.

9. The method in accordance with claim 7, further comprising:
selectively actuating a variable bleed valve to discharge the second portion of the flow of first compressed air towards the heat exchanger.

* * * * *